United States Patent [19]
Walter et al.

[11] Patent Number: 5,682,835
[45] Date of Patent: Nov. 4, 1997

[54] BIRD FEEDER

[75] Inventors: Glen V. Walter, Middleton; Mark P. Zieff, Sudbury; John B. Stone, Southboro; Leon A. Gainsboro, Wayland, all of Mass.

[73] Assignee: Safety 1st, Inc., Chestnut Hill, Mass.

[21] Appl. No.: 514,503

[22] Filed: Aug. 11, 1995

[51] Int. Cl.$^6$ .................... A01K 39/01; A01K 39/026
[52] U.S. Cl. .................... 119/57.8; 119/77
[58] Field of Search .................... 119/51.5, 72, 72.5, 119/77, 52.2, 52.3, 57.8, 57.9; 54/71

[56] References Cited

U.S. PATENT DOCUMENTS

| | | | |
|---|---|---|---|
| 3,125,069 | 3/1964 | Fowler | 119/77 |
| 4,450,790 | 5/1984 | Stansbury, Jr. | 119/51.5 X |
| 4,691,665 | 9/1987 | Hefner | 119/77 |
| 5,107,796 | 4/1992 | Embrey | 119/72 |
| 5,303,674 | 4/1994 | Hyde, Jr. | 119/77 |
| 5,507,249 | 4/1996 | Shaw | 119/72 |

FOREIGN PATENT DOCUMENTS

1469030  1/1975  United Kingdom ............ 119/51.5

Primary Examiner—Robert P. Swiatek
Assistant Examiner—Elizabeth Shaw
Attorney, Agent, or Firm—Wolf, Greenfield & Sacks, P.C.

[57] ABSTRACT

A bird feeder assembly having a funnel integrated into the feeder assembly facilitates the filling of the bird feed container.

22 Claims, 6 Drawing Sheets

BIRD FEEDER

INTRODUCTION

This invention relates to bird feeders and more particularly comprises a new and improved feeder having a funnel that is an integrated part of the feeder to assist in filling the feed container.

Conventionally bird feeders include a feed container with associated perches and/or platforms for the birds as they feed on the contents of the containers. The containers typically are in the form of tubes or bottles open at least at one end, through which feed in the form of seed or liquid is introduced into the container. In some feeders, the container is open only at the bottom and must be inverted for filling. Such containers are often glass bottles (although they may be made of other materials) that function as feeders in the inverted position with the closed end on top. Once filled, the containers are closed by a base and then inverted to the normal operating position, and frequently such feeders carry a decorative cap on the top which serves an aesthetic purpose for the top end of the container in the operative position and also may serve as a hanger for the feeder. Other bird feeders have containers made of plastic tubes or cylinders that are open at both ends, and the lower ends is closed by a base or plate which are not normally removed once assembled on the tubes. Removable covers are placed on the open upper ends, and are removed when seed is poured into the tubes. The foregoing is by no means an exhaustive description of the prior art. The containers, whether in the shape of bottles or tubes may be of a variety of shapes, sizes and materials. For example, some feeders that have bottle-type containers are not inverted in their operative position but rather are filled through the top. The kinds of feeders described above as well as other forms of feeders used by hobbyists are frequently a nuisance to fill. Seed feed is normally packaged in rather large and heavy bags from which it is not easy to pour seed in a controlled stream into a relatively small opening of a bottle, tube or other seed container used in bird feeders. It is also difficult to pour liquid feed into the feeders without spilling it.

The primary object of the present invention is to provide a convenient means for pouring seed or liquid feed into the container of a bird feeder. More particularly, the primary object of the invention is to provide a filling funnel as part of the feeder, which will enable the hobbyist to pour seed into the container of a bird feeder from a large and heavy seed bag or liquid storage container without spilling any of the feed.

To accomplish these and other objects the feeders of the present invention include funnels that are part of the feeder assemblies. Preferably the funnels serve a dual purpose, that is, when not in use as a funnel during filling, they are an integral part of the feeder design and perform a useful function. Because they are an integral part of the assembly and the feeder is in a sense incomplete when the funnel is not assembled as part of it, the funnel will not be misplaced or become separated from the feeder but rather will always be at hand to serve its intended function when the feeder is being filled.

In accordance with one embodiment of this invention, the funnel serves as the decorative cover of the container. When performing that function, the cover sits on the closed upper end of the container that is filled through the bottom end. The cover/funnel must be removed and inverted and placed on the other end of the container which also must be inverted for filling. In another embodiment of this invention, the funnel is part of the cover assembly of the feeder, and it must be removed from the cover assembly, inverted and then placed on the open end of the container so that it can serve as a funnel for filling purposes.

These and other objects and features of the present invention will be better understood and appreciated from the following detailed description of the preferred embodiments thereof, read in connection with the accompanying drawings. The preferred embodiments are presented as illustrative of the invention and not to define the limits of the invention.

DETAILED DESCRIPTION

Figure 1:
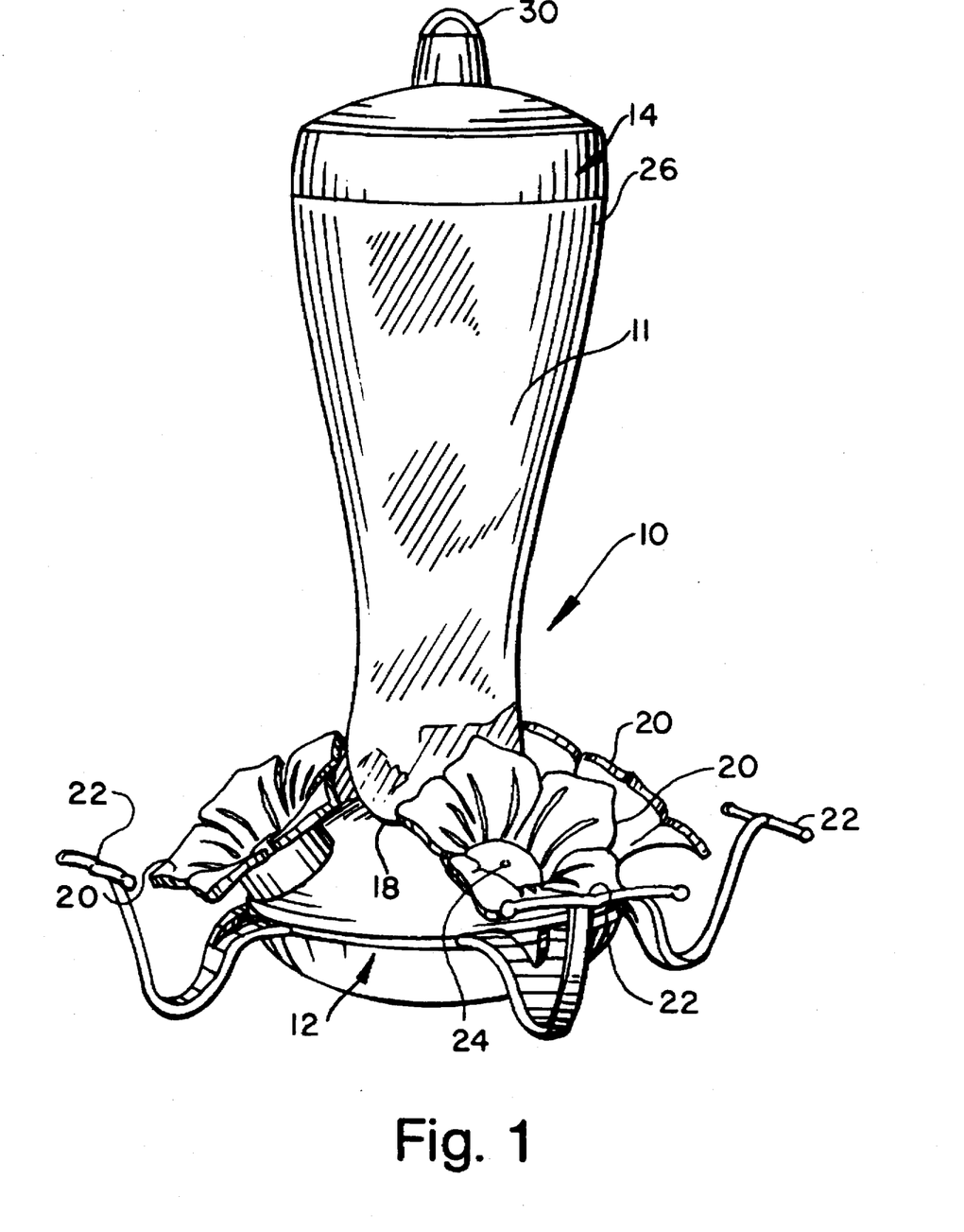
FIG. 1 is a perspective view of one embodiment of a bird feeder constructed in accordance with this invention.
Figure 2:
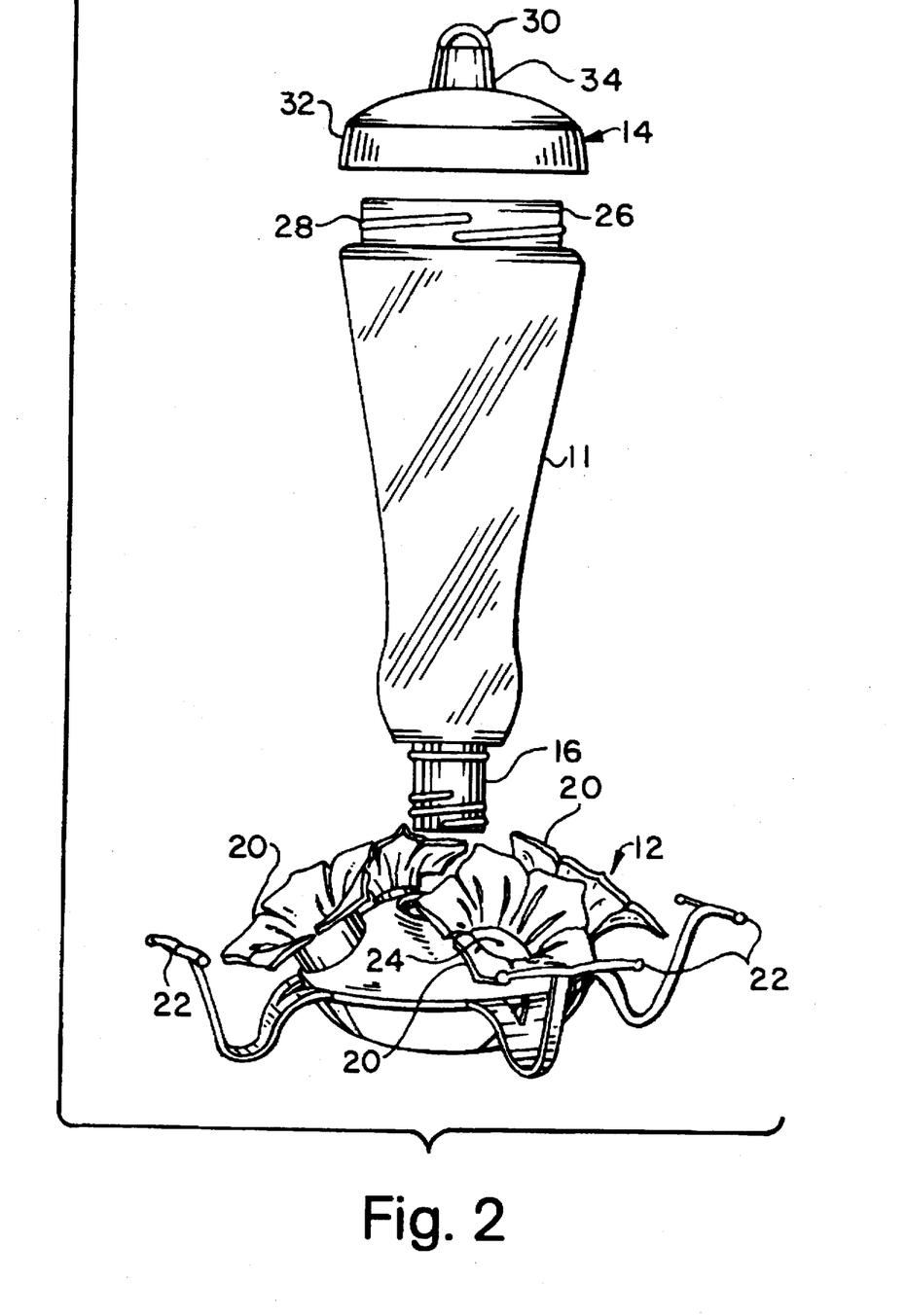
FIG. 2 is an exploded perspective view of the bird feeder shown in FIG. 1.
Figure 3:
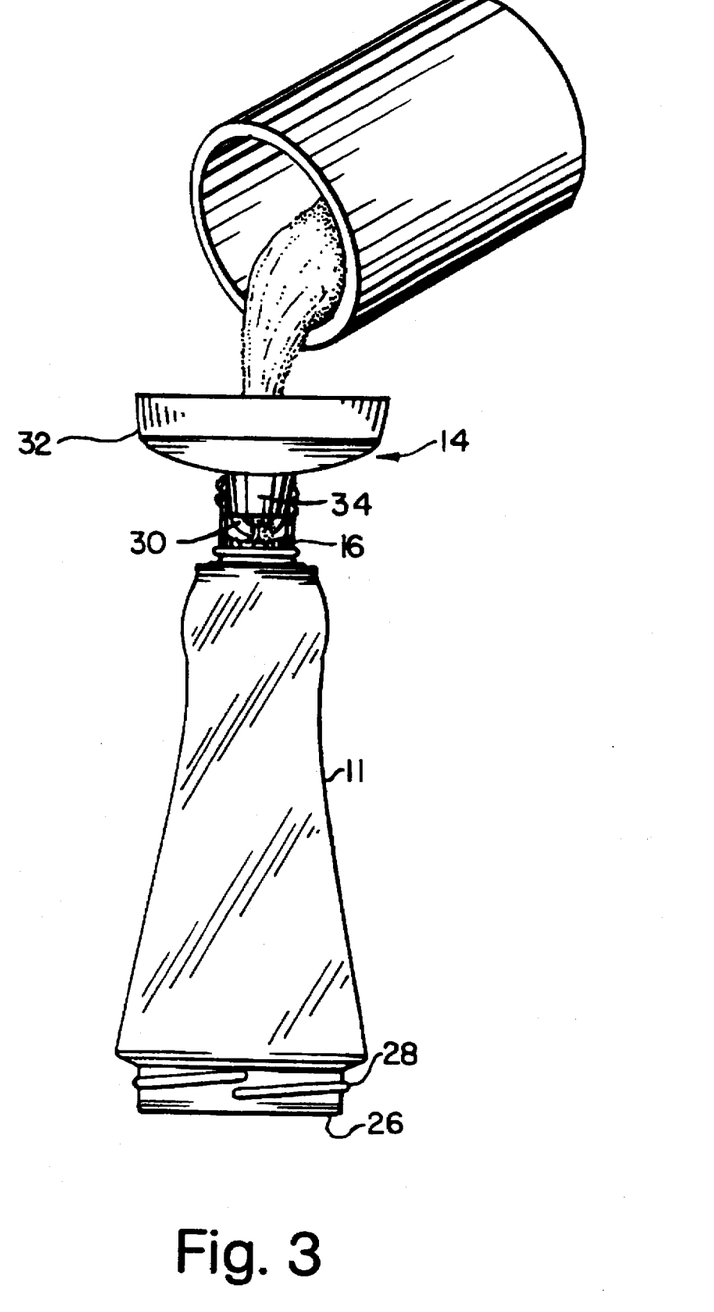
FIG. 3 is a side view of the container of the bird feeder of FIGS. 1 and 2 with the base of the feeder removed, the container inverted and with the cover/funnel in the funnel functioning position.

The bird feeder 10 shown in FIGS. 1–3 that is particularly designed to feed hummingbirds includes a feed container 11, base 12 and cover 14. The container 11 is a bottle that may be made of glass, plastic or other material, and in the operative position is inverted with its neck 16 at the lower end of the container. The neck 16 is externally threaded and screws into the inlet 18 of the base 12. The base 12 has a number of feeding stations 20 that include perches 22 upon which birds may stand when eating at one of the stations. Each station 20 has a port 24 through which liquid feed normally fed to hummingbirds may be eaten by a bird resting on a perch. This type of hummingbird feeder is well-known in the art. The bottle that forms the container 11 is closed at its end 26 (the upper end when the bottle is inverted to the bird feeding position) and carries external threads 28 that register with internal threads in the cover 14. When threaded onto the end 26 of the container 11, the cover performs a decorative function and also provides a hanger 30 by means of which the feeder may be suspended. The cover 14 is of unique design in that in the position of FIG. 1 it appears as a conventional cover on the top end 26 of the container 11. However, when removed from that end and inverted, it is the shape of a funnel and is sized to register with the neck 16 of the container when the container is also inverted, as shown in FIG. 3. The cover is composed of three parts, namely a main body 32 that serves as the funnel hopper when the cover is inverted, a cap 34 that serves as a spout for the funnel (the cap is hereafter sometimes identified as the spout), and the hanger 30 which functions only when the cover is upright.

In the operative position shown in FIG. 1, the liquid feed is disposed in the bottle container 11. The feed in the container flows into the base 12 where it is accessible through the ports 24 in the several feeding stations 20 that form part of the base 12. To refill the container 11, both the cover (hereafter sometimes called cover/funnel) 14 and the base 12 are unscrewed and removed from the container, and the container is inverted and placed on a flat surface. The end 26 of the container is flat so that the bottle will stand steadily on the flat surface. Next the funnel 14 is placed with its spout 34 extending into the open neck 16 of the container 11 as shown in FIG. 3. The liquid feed may then be conveniently poured into the hopper (body 32) of the funnel and flow freely into the glass bottle container 11 via the spout as also suggested in FIG. 3. When filling is complete, the cover/funnel 14 is removed, and the base 12 is re-threaded onto the neck 16. Thereafter, the container is again inverted, and the cover/funnel 14 is threaded onto the closed end 26 of the bottle (container 11). So reassembled, the feeder 10 can be hung on a pole, tree branch or other support (not shown) by means of the hanger 30.

Figure 4:
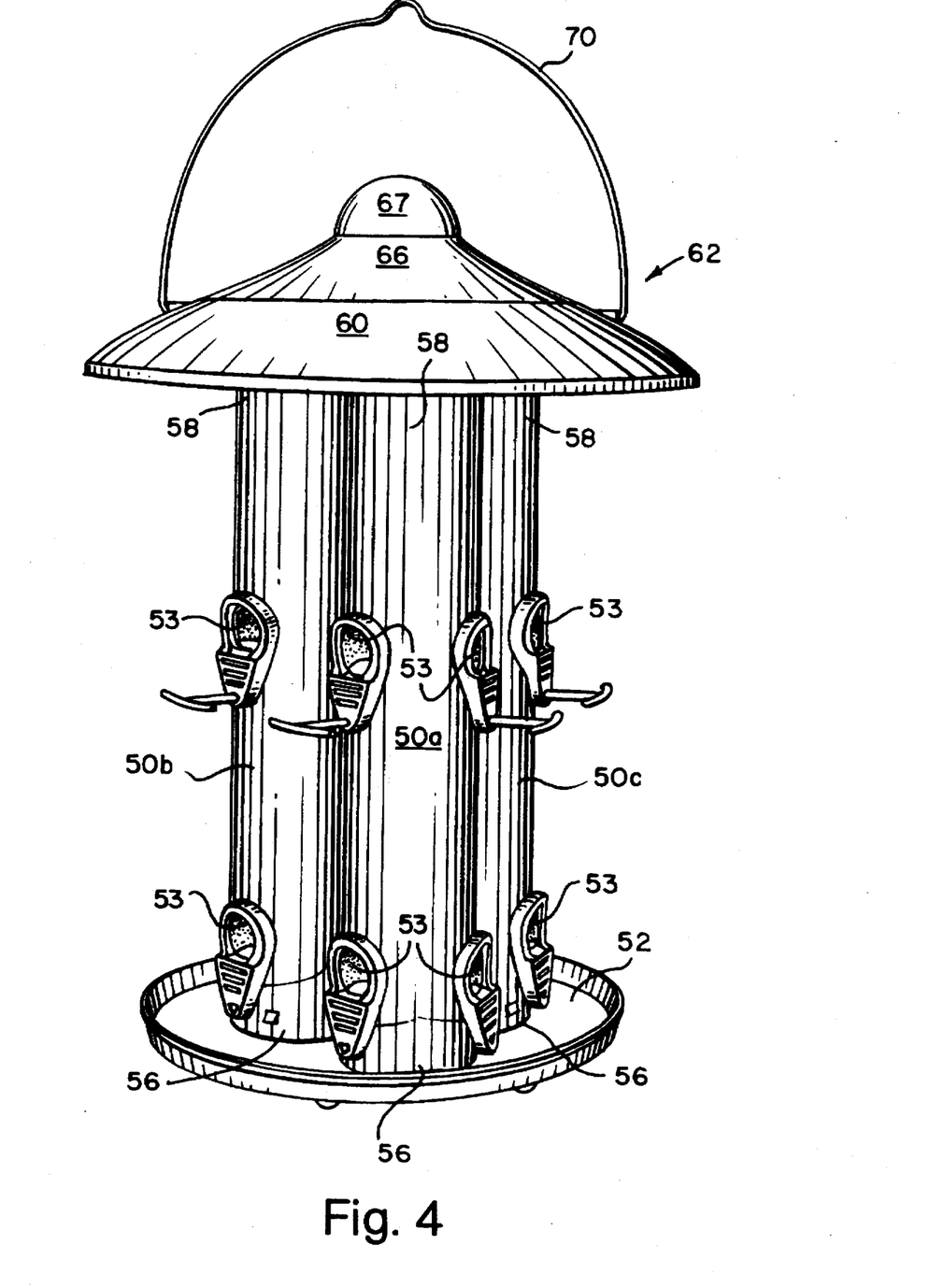
FIG. 4 is a perspective view of another embodiment of bird feeder constructed in accordance with this invention.
Figure 5:
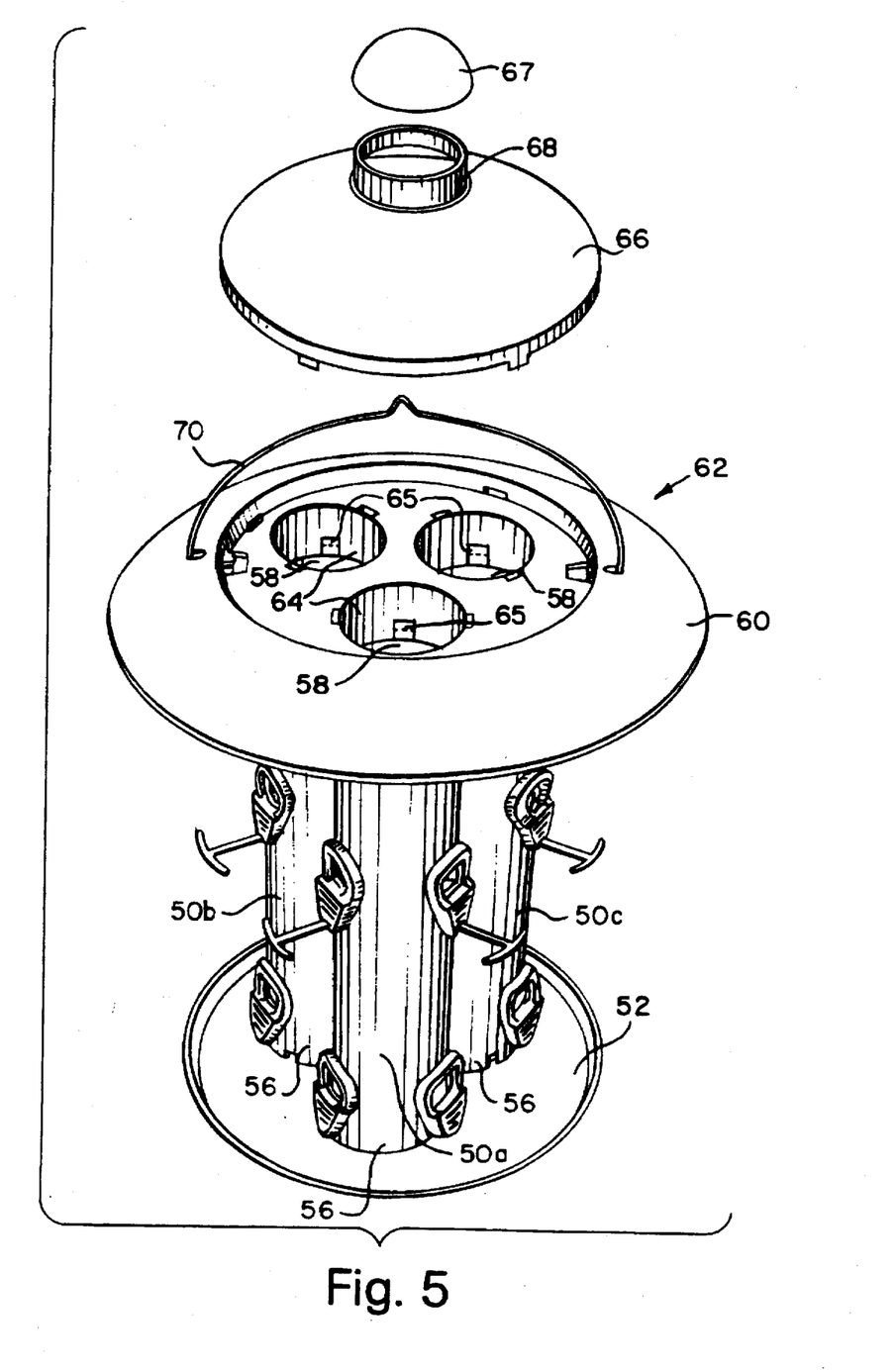
FIG. 5 is an exploded perspective view of the bird feeder shown in FIG. 4.
Figure 6:
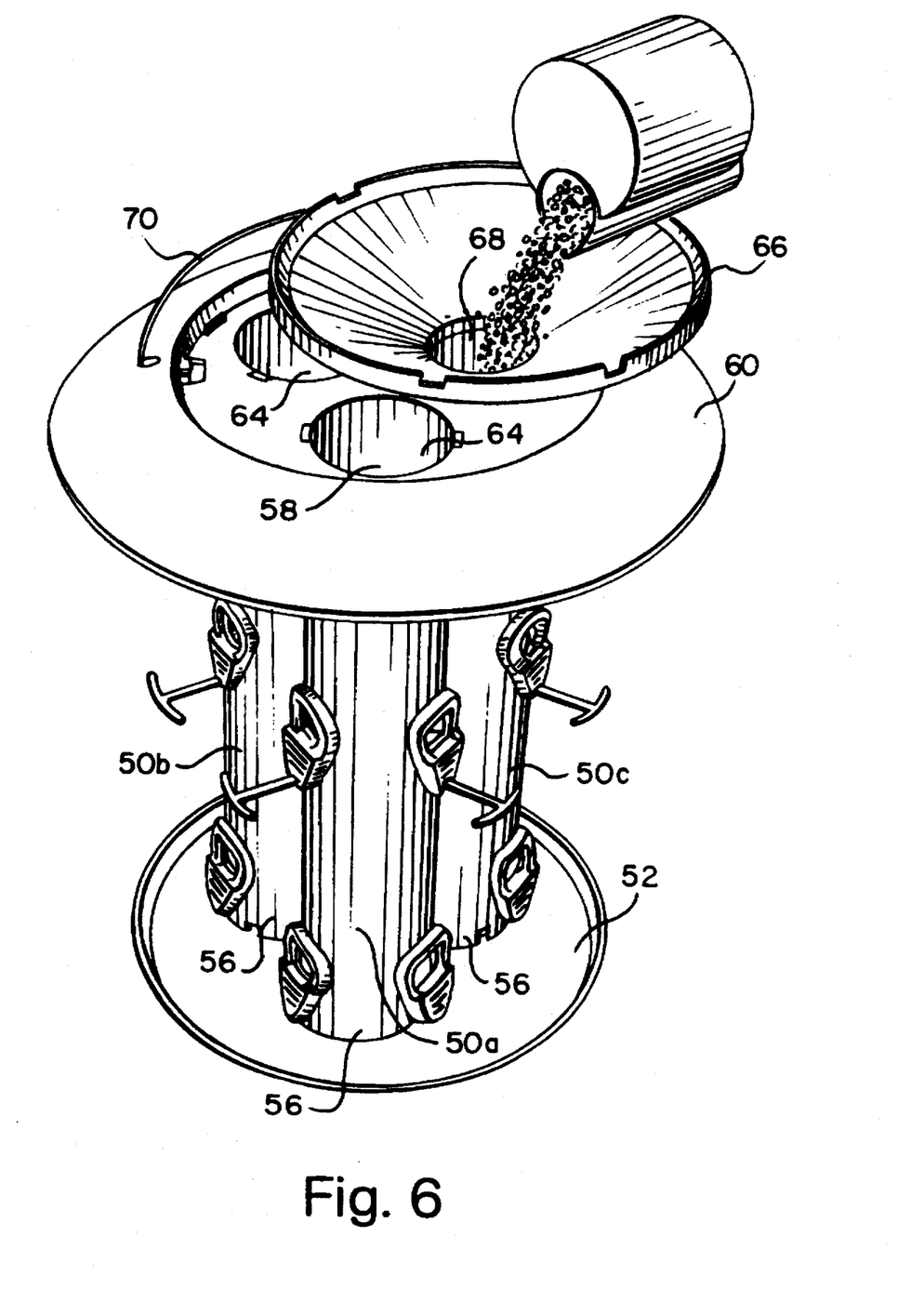
FIG. 6 is a perspective view of the feeder of FIGS. 4 and 5 with the top portion of the cover inverted so as to serve as a funnel with its discharge spout registering with the open top of one of the containers, to assist in introducing seed into that container of the feeder.

The bird feeder shown in FIGS. 4–6 is another embodiment of this invention. Unlike the feeder of the first described embodiment, this feeder has a plurality of seed tubes that comprise the feed containers, and all the containers may be filled with the same or different kinds of seed. In this embodiment, the containers are preferably made of plastic and are tubular in shape, and are open at both ends although shapes, sizes, and materials of the tubes may vary. The tubes are identified as 50a, 50b and 50c, and they are closed at the bottom by the base 52 which may serve as a perch for certain varieties of birds and as a seed saver by preventing seed from falling from the feed openings 53 in the tubes to the ground. The base may have collars (not shown) or some other structure for engaging and releasably locking to the bottoms 56 of the tubes.

The top open ends 58 of the tubes are connected to the lower portion 60 of the cover assembly 62. In this embodiment, lower cover portion 60 of the cover assembly carries a plurality of depending collars 64 that fit within and releasably engage the open ends 58. Barbs 65 on the collars releasably engage holes (not shown) in the tubes to secure the tubes to the cover portion 60. As the collars 64 are open at both the top and bottom, the interior of each tube is accessible through its top end 58 via the collar 64 without detaching the lower cover portion 60. The lower cover portion 60 in turn carries the upper cover portion 66 that closes the tops 58 of the tubes and collars 64, and the upper cover portion 66 in turn carries a detachable cap 67 on the central extension 68. The upper cover portion 66 serves the dual function of closing the tops of the tubes 50a, 50b and 50c and acting as a funnel to assist in filling the tubes. When the upper cover is inverted to function as a funnel, the extension 68 becomes the funnel spout. The cover is shown in the funnel position in FIG. 6 with the spout 68 extending into the top end of one tube 50c and its collar 64, and seed is being poured into the funnel. Obviously, each of the container tubes 50 may be filled in this manner. The cover assembly 62 also includes a wire bail 70 by which the feeder may be suspended from a branch, pole or other support.

The feeder is in the bird feeding configuration in FIG. 4. When one or more of the container tubes 50 requires filling, the cap 67 and upper cover 66 are removed from the lower cover portion 60, and the upper cover portion is inverted and its extension 68 which serves as the funnel spout is inserted into the top end 58 of one of the tubes to be filled, as suggested in FIG. 6. The seed may be conveniently poured into the hopper of the funnel from which the seed will flow into the tube 50 through the spout. When filling is completed, the funnel is again inverted to the cover position above the lower cover portion 60, and the cap 67 is placed on the extension 68. If desired, snaps may be provided to releasably secure the upper portion 66 of the cover to the lower portion 60. The wire bail 70 may then be used to hang the feeder.

While in the embodiment of FIGS. 4–6 the feeder has three separate seed containers 50, it is to be understood that the invention is applicable to bird feeders regardless of the number of containers utilized. Moreover, the feeder of FIGS. 1–3 may include more than one feed container 11 without departing from the scope of the present invention. Because numerous modifications may be made to the illustrated embodiments, it is not intended that the scope of the invention be limited to them. Rather, the breadth of the invention is to be determined by the appended claims and their equivalents.

We claim:

1. A bird feeder assembly comprising a feed container having an opening through which feed may be introduced into the container, and a funnel integrated into the assembly, which may be mounted so as to register with the opening to facilitate filling the container with feed, said funnel being integrated into the assembly when the feeder is in the feeding configuration in a position which is different from the position of the funnel when it registers with the opening.

2. A bird feeder assembly as defined in claim 1 wherein the opening is at the top of the container when the feeder is in its feeding configuration.

3. A bird feeder assembly comprising a feed container having an opening through which feed may be introduced into the container, the opening being at the bottom of the container when the feeder is in its feeding configuration, and a funnel integrated into the assembly, which may be mounted so as to register with the opening to facilitate filling the container with feed.

4. A bird feeder assembly as defined in claim 1 wherein the funnel is integrated as a cover into the assembly when the feeder is in its feeding configuration.

5. A bird feeder comprising a feed container having top and bottom ends with at least one end being an open end, a cover having a top portion and detachably secured to the top end of the container and being funnel-shaped and capable of functioning as a funnel when inverted, said cover including a discharge spout at the top portion and sized to fit into the open end of the container whereby the cover when inverted may register with the open end when the container is positioned with its open end on top to facilitate pouring feed into the container.

6. A bird feeder as defined in claim 5 wherein the open end of the container is the top end when the container is in the normal bird feeding position.

7. A bird feeder as defined in claim 5 wherein the open end of the container is the bottom end thereof when the container is in the normal bird feeding position.

8. A bird feeder as defined in claim 5 wherein a cap is provided to cover and close the spout when the cover is attached to the top of the container.

9. A bird feeder as defined in claim 5, wherein a base is secured to the bottom end of the container when the container is oriented in the bird feeding position.

10. A bird feeder as defined in claim 9 wherein the bottom end of the container is open and the base closes the open bottom of the container.

11. A bird feeder as defined in claim 9 wherein the base is removed and the container is inverted to mount the cover in the funnel position on the open end.

12. A bird feeder as defined in claim 5 wherein the cover includes lower and upper portions, said lower portion being secured to the top of the container and said upper portion being funnel-shaped when inserted and being detachable from the lower portion.

13. A bird feeder as defined in claim 12 wherein the container open end is at the top and the lower portion has an opening communicating with the opening at the top and the funnel includes a spout which connects to the opening in the lower portion when feed is to be poured into the container.

14. A bird feeder as defined in claim 13 wherein the funnel closes the opening in the lower portion when the funnel is inverted to serve as a cover.

15. A bird feeder as defined in claim 14 wherein a cap is removably attached to the spout of the funnel to close the spout when the funnel section is in the cover functioning position.

16. A bird feeder as defined in claim 15 wherein the top and bottom of the container are open.

17. A bird feeder as defined in claim 15 wherein a base is secured to the bottom of the container when the container is oriented in the bird feeding position to close the container bottom.

18. A bird feeder as defined in claim 5 wherein the container is a bottle open at the bottom when the container is in the bird feeding position.

19. A bird feeder as defined in claim 5 wherein the container is a vertical tube open at both top and bottom.

20. A bird feeder as defined in claim 5 wherein the feeder includes a plurality of containers each being a tube, and said funnel spout is sized to fit into the open end of each of the containers for pouring feed into each of the containers.

21. A bird feeder as defined in claim 18 wherein the container is a glass bottle.

22. A bird feeder as defined in claim 20 wherein the containers are plastic tubes.

* * * * *

UNITED STATES PATENT AND TRADEMARK OFFICE
CERTIFICATE OF CORRECTION

PATENT NO. : 5,682,835

DATED : November 4, 1997

INVENTOR(S) : Glen V. Walter, Mark P. Zieff, John B. Stone and Leon A. Gainsboro It is certified that error appears in the above-identified patent and that said Letters Patent is hereby corrected as shown below:

On the title page item [73], delete "Safety 1st, Inc., Chestnut Hill, Mass." and insert "Opus, Inc., Bellingham, Mass."

Signed and Sealed this

Fourteenth Day of September, 1999

Attest:

Q. TODD DICKINSON

*Attesting Officer*  *Acting Commissioner of Patents and Trademarks*